United States Patent [19]

Ceccarelli

[11] Patent Number: 4,836,481
[45] Date of Patent: Jun. 6, 1989

[54] SUPPORT FOR WRITING DESKS
[75] Inventor: Pietro Ceccarelli, Massa, Italy
[73] Assignee: Olivetti Synthesis, S.p.A., Ivrea, Italy
[21] Appl. No.: 163,143
[22] Filed: Feb. 25, 1988

Related U.S. Application Data

[63] Continuation of Ser. No. 902,707, Sep. 2, 1986, abandoned.

[30] Foreign Application Priority Data

Sep. 18, 1985 [IT] Italy .................. 67789 A/85

[51] Int. Cl.⁴ .................................. A47B 3/06
[52] U.S. Cl. ........................... 248/188.1; 248/558;
   403/363; 403/300; 403/187; 108/153
[58] Field of Search ............ 248/188.1, 558, 165;
   403/363, 300, 187; 108/153, 155; 312/108, 195,
   257 SK, 257 A

[56] References Cited

U.S. PATENT DOCUMENTS

| | | | |
|---|---|---|---|
| 1,201,703 | 10/1916 | Davidson | 403/363 X |
| 3,082,712 | 3/1963 | Trautmann et al. | 108/153 |
| 3,327,657 | 6/1967 | Hauville | 108/153 |
| 3,413,813 | 12/1968 | Rock et al. | 403/363 X |
| 3,711,133 | 1/1973 | Werner | 248/188.1 X |
| 4,323,291 | 4/1982 | Ball | 312/223 X |
| 4,444,125 | 4/1984 | Welsch et al. | 108/153 X |
| 4,516,874 | 5/1985 | Yang et al. | 403/363 X |
| 4,611,948 | 9/1986 | Johnson | 403/187 X |
| 4,619,486 | 10/1986 | Hannah et al. | 312/195 |
| 4,639,049 | 1/1987 | Frascaroli et al. | 312/195 |

FOREIGN PATENT DOCUMENTS

1477591 3/1967 France ................ 403/187

Primary Examiner—Ramon S. Britts
Assistant Examiner—Karen J. Chotkowski
Attorney, Agent, or Firm—Banner, Birch, McKie & Beckett

[57] ABSTRACT ahe support extends longitudinally beneath the worktop portion of the desk, structurally connects tubular legs, box legs, load-bearing drawer units and worktop portions and is formed by modular elements of predetermined length having at the ends thereof connecting elements for connecting modular elements end to end. Mountings are provided at intervals for laterally connecting other modular elements by means of connecting elements giving rise to various configurations. The modular elements and the connecting elements internally house power outlets and cables and are of channel section with large openings of intervals along their bottom and side walls, to permit easy access to the cables and to power outlets for supplying the items of electrical equipment which are supported by the worktop portions.

10 Claims, 6 Drawing Sheets

SUPPORT FOR WRITING DESKS

This application is a continuation of application Ser. No. 902,707, filed Sept. 2, 1986 and now abandoned.

BACKGROUND OF THE INVENTION

The present invention relates to supports for writing desks or tables of variable configuration, comprising a longitudinal support which extends beneath the worktop portion and which structurally connects legs and worktop portions.

A support for writing desks is known, within which are disposed electrical and telephone cables and electrical power distribution units. That support suffers from the disadvantage that access to the cables or to the distribution units is difficult once they have been housed in the support. In the event of damage or failure or when fresh connections are required, fresh cables and distribution units are therefore necessary, which are mounted on the outside, with clearly apparent additional clutter and obstructions and ugly overall results.

SUMMARY OF THE INVENTION

The object of the present invention is to provide a support for writing desks and tables which is suitable for housing electrical cables and which is simple, reliable and low in cost and which permits modular assembly and easy access to the cables for maintenance operations or for making fresh connections.

The support for writing desks and tables of variable configuration, in accordance with the invention, is characterised in claim 1 below.

BRIEF DESCRIPTION OF THE DRAWING

A preferred embodiment of the invention is set forth in the following description which is given by way of non-limiting example with reference to the accompanying drawing in which.

DESCRIPTION OF THE PREFERRED EMBODIMENT

Figure 1:
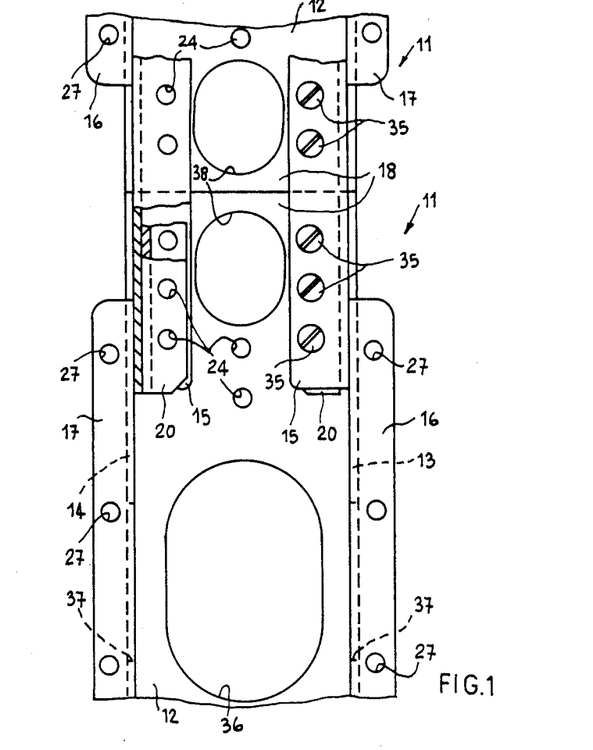
FIG. 1 shows a plan view of part of the support according to the invention, with a first type of connection.
Figure 2:
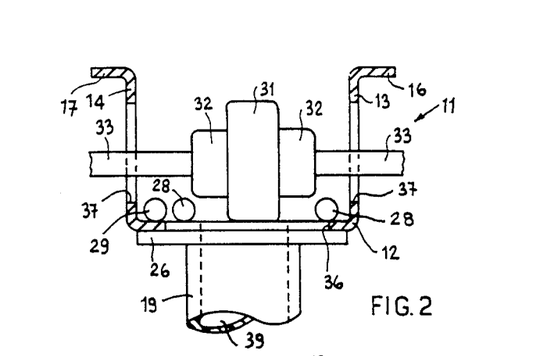
FIG. 2 is a view in section of part of the support shown in FIG. 1, connected to a tubular support leg.

Referring to FIGS. 1 and 2, the support for writing desks and tables of variable configuration is generally indicated by reference numeral 11 and comprises a modular element of predetermined length with a cross-section in the form of an inverted omega.

The modular element 11 comprises a base 12 and two side walls 13 and 14 which each terminate with an external edge or limb portion 16 and 17 substantially parallel to the base 12. Fixed to the ends of the modular element 11, for example by welding, are two members of C-shape section, as indicated at 15, with a stiffening function. The members 15 define connecting elements 18 of the support and are capable of being connected in known manner, for example by means of screws (not always shown in the drawing) either to flanges of tubular legs 19 (see FIG. 6) or to box-like legs 21 or to load-bearing drawer units 22 (see FIG. 5). In addition, by means of a pair of further C-shaped members as indicated at 20, the element 18 (see FIG. 1) can be connected to a further connecting element 18 of a second modular element 11 (see FIG. 1), an interconnection module 41 (see FIG. 3) or a terminal module 61 (see FIG. 4).

The modular element 11 extends longitudinally beneath a worktop portion 23 (see FIG. 5) and structurally connects the tubular legs 19 (see FIG. 6) or the box legs 21 or the load-bearing drawer units 22 (see FIG. 5), to the worktop portions 23. For that purpose, each connecting element 18 (see FIG. 1) has a series of holes 24 for fixing the modular element 11 either to a plate 26 (see FIG. 2) which is fixed with respect to the end of the tubular leg 19 or to the box-like legs 21 (see FIG. 6) or to the load-bearing drawer units 22 (see FIG. 5). Each edge portion 16 and 17 (see FIG. 1) has a series of holes 27 for receiving screws (not shown in the drawing) for fixing the modular element 11 to the worktop portion 23 (see FIGS. 5 and 6).

The modular element 11 operates as a containing means for electrical cables 28 (see FIG. 2) and telephone cables 29, and can house electrical power distribution units 31 at various points therein and permits the passage of outlets or sockets 32 and cables 33 at various points. That is possible because each modular element 11 is provided in the length thereof with various large openings or slots 36 and 37 which are provided respectively in the base 12 and the side walls 13 and 14. The size of the openings 36 and 37 is such as also to permit the hands of the operator to pass therethrough, so that the operator can thus make various connections to the distribution units 31 by means of the outlets 32 and can therefore come out with various cables 33 depending on the requirements involved and the positions of the machines standing on the worktop portions 23.

FIG. 2 shows two electrical cables 28, a telephone cable 29, a distribution unit 31 and two outlets or sockets 32 connected to cables 33. That representation is given purely by way of nonlimiting example, for the purposes of the present invention.

Some of the connecting elements 18 (see FIG. 1) have an opening or slot 38 which is disposed between the holes 24 and which communicates with a hole 39 (see FIG. 2) of the tubular leg 19 or with holes (not shown) of the box legs 21 (see FIG. 5) and the drawer units 22 to permit the passage therethrough of electrical and telephone cables for connection to other writing desks 23. The openings 36, 37 (FIG. 1) and 38 have their edges turned over inwardly (not shown in the drawing), which strengthen the support and avoid the cables being accidentally cut during handling thereof.

Figure 3:
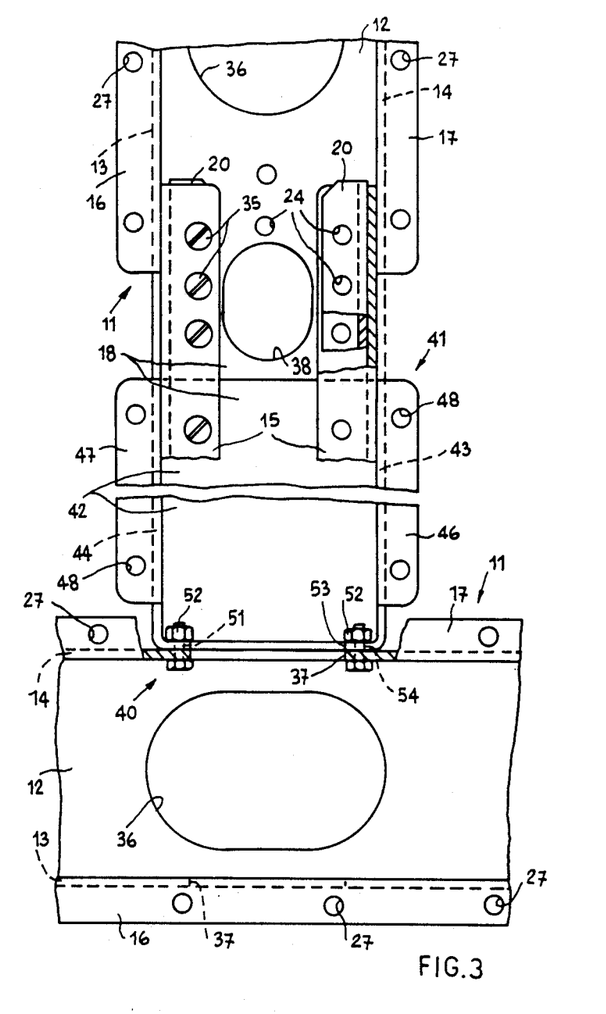
FIG. 3 is a plan view of part of the support shown in FIG. 1, with another type of connection.

Reference is now made to FIG. 3 which shows a connection between two modular elements 11 which are disposed perpendicularly relative to each other, by means of the interconnection module 41 and one of a series of connecting portions 40 of one of the two modular elements 11. That form of connection makes it possible to produce writing desks of variable configurations as diagrammatically indicated in FIGS. 7 and 8, as will be described hereinafter.

The interconnection module 41 (see FIG. 3) is of predetermined length and the section in the form of an inverted omega is substantially similar to that of the modular element 11. Indeed, it comprises a base 42 and two side walls 43 and 44 which terminate with edge portions 46 and 47 having holes 48 for fixing the worktop portion 23. In addition the module 41 is also provided with a connecting element 18. The two modules 11 and 41 are connected in aligned relationship by means of a pair of C-shaped members 20 which are fixed in known manner, for example by means of screws 35, to the C-shaped members 15 which define the elements 18 of the two modules 11 and 41.

The lateral connecting portions 40 each comprise an opening or slot 37 and a plurality of holes 54 around each opening. The interconnection module 47 in turn comprises a flange 51 by means of which it is fixed by screws 52 and the holes 54 in the lateral connecting portion 40, to the side walls 13 or 14 of the modular element 11. The flange 51 defines a slot or opening 53 which is aligned with the opening 37 in the portion 40. That arrangement thus provides a strong and easily dismantlable connection. The openings 37 and 53 define a large aperture for the cables 28 and 29 to pass therethrough.

Figure 4:
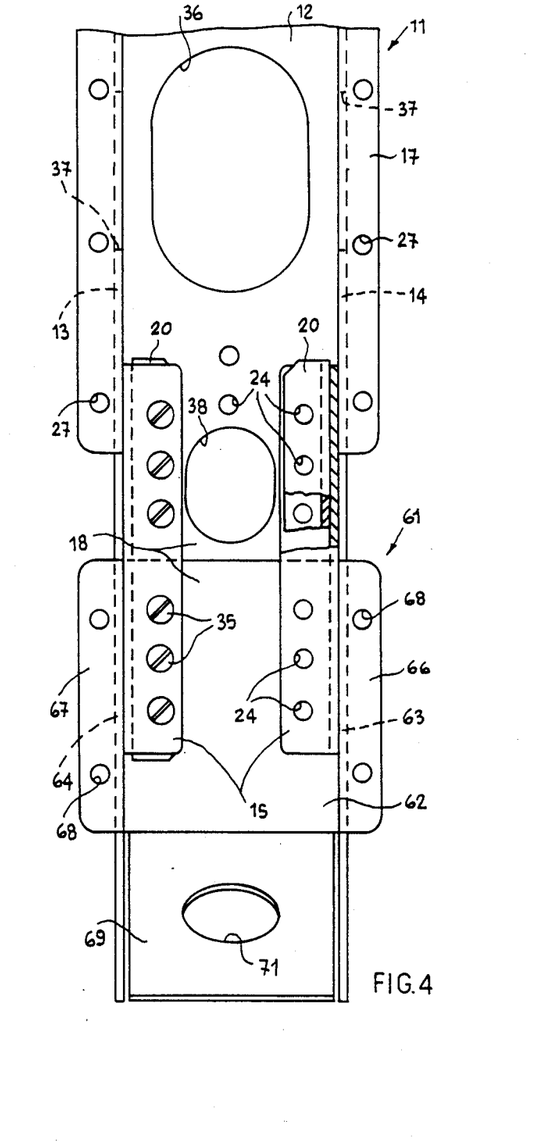
FIG. 4 is a plan view of part of the support shown in FIG. 1, with a further type of connection.
Figure 5:
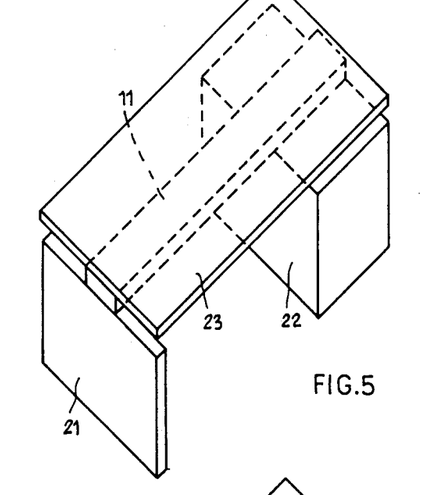
FIG. 5 is a diagrammatic view of a writing desk with the support shown in FIG. 1.

Referring now to FIG. 4, shown therein is a connection between the connecting element 18 of a modular element 11 and the terminal module 61. This connection makes it possible to connect square or rectangular worktop portions to semicircular worktop portions in an array of writing desks of variable configuration, as diagrammatically shown in FIGS. 7 and 8.

The terminal module 61 (FIG. 4) has a portion formed by a shaped member with a cross-section in the form of an inverted omega, substantially similar to that of the modular element 11, and comprises a base 62 and two side walls 63 and 64 which terminate with edge portions 66 and 67 having holes 68 for fixing the worktop portion. The module 61 is provided at one of the ends thereof with a connecting element 18 which can be connected to the connecting element 18 of the support 11 by means of screws and a pair of shaped members 20. The other end of the module 61 terminates with a front inclined wall portion 69 having a hole or seat 71 for the cables 28 and 29 to pass therethrough.

Figure 6:
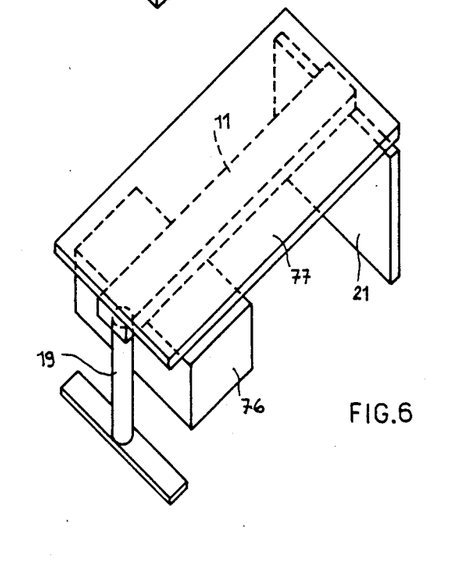
FIG. 6 is a diagrammatic view of another writing desk with the support shown in FIG. 1.

FIGS. 5, 6, 7 and 8 diagrammatically show various constructions which provide for assembly of the modular element 11 to straightforward worktop portions 23 or worktop portions of variable configurations. In particular, in FIG. 5, the modular element 11 is structurally connected to the box leg 21, to the load-bearing drawer unit 22 and to the worktop portion 23. In FIG. 6, the modular element 11 is structurally connected to the tubular leg 19, to the box leg 21, to a suspended drawer unit 76 and to a worktop portion 77. In such cases, the visible ends of the support 11 are closed by a cover element (not shown in the drawings).

Figure 7:
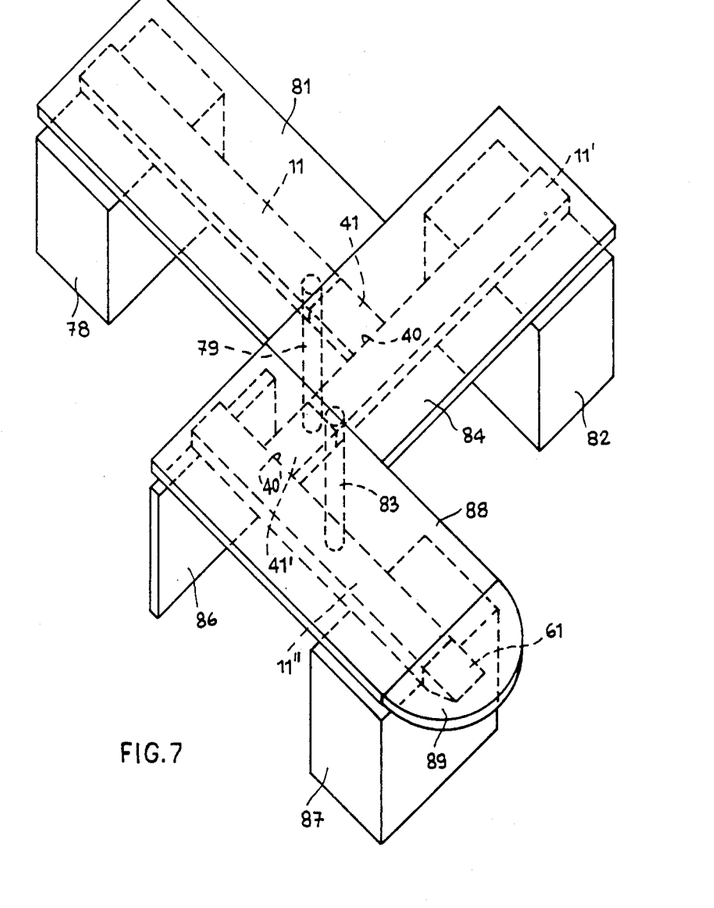
FIG. 7 is a diagrammatic view of a type of writing desks integrated with the support or the connections shown in FIGS. 3 and 4.

In FIG. 7, the modular element 11 is structurally connected to a load-bearing drawer unit 78, to a tubular leg 79, to a worktop portion 81 and, by means of an interconnection module 41, to a lateral connecting portion 40 of a second modular element 11' which is perpendicular to the first modular element 11. The module 11' is in turn structurally connected to a load-bearing drawer unit 82, to a tubular leg 83, to a worktop portion 84 and, by means of a second interconnection module 41', to a second lateral connecting portion 40' of a third modular element 11" which is perpendicular to the second modular element 11'. The modular element 11" is finally structurally connected to a box leg 86, to a load-bearing drawer unit 87, to a worktop portion 88 and, by means of a terminal module 61, to a semicircular worktop portion 89.

Figures 8, 9:
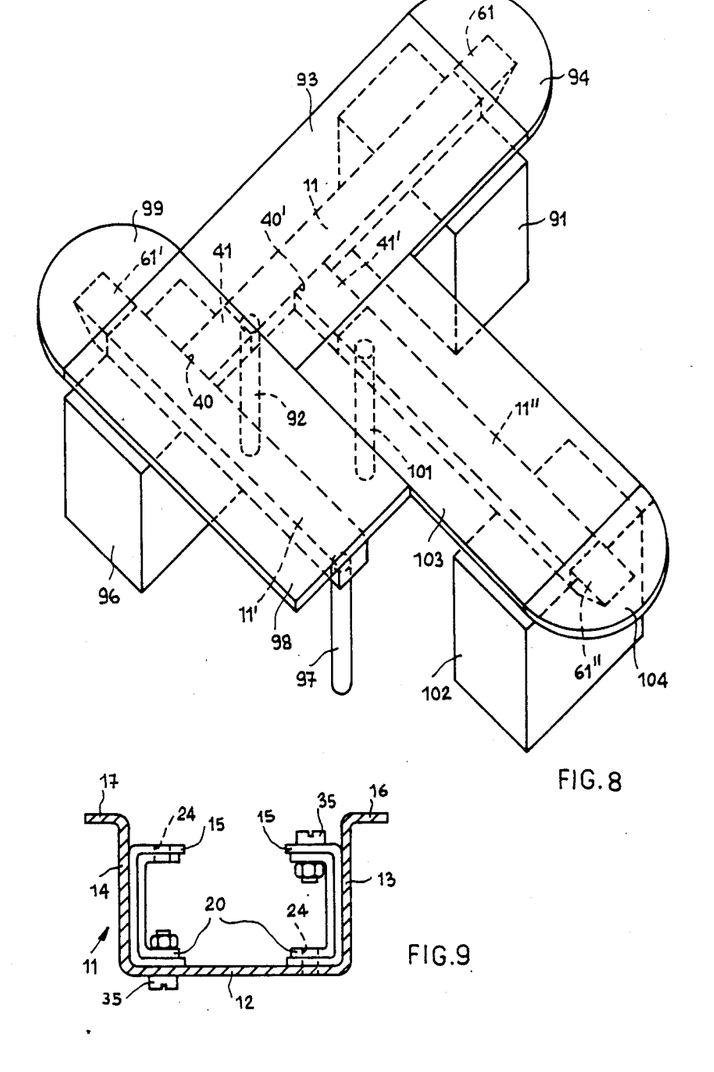
FIG. 8 is a diagrammatic view of another type of writing desks integrated with the support and the connections shown in FIGS. 3 and 4.
FIG. 9 is a diagrammatic view in section of the support shown in FIG. 1.

In FIG. 8, the modular element 11 is structurally connected to a load-bearing drawer unit 91, to a tubular leg 92, to a worktop portion 93, and, by means of a terminal module 61, to a semicircular worktop portion 94, and, by means of an interconnection module 41 and the lateral connecting portion 40, it is further structurally connected to a second modular element 11' which is perpendicular to the first modular element 11. The second element 11' is in turn structurally connected to a load-bearing drawer unit 96, to a tubular leg 97, to a worktop portion 98, to a second terminal module 61' and to the semicircular worktop portion 99. The first modular element 11 is also connected by means of a second interconnection module 41' and a lateral connecting portion 40' to a third modular element 11" which is perpendicular to the first modular element 11 and parallel to the second modular element 11'. The last element 11" is finally structurally connected to a tubular leg 101, to a load-bearing drawer unit 102, to a worktop portion 103, to a third terminal module 61' and to the semicircular worktop portion 104.

The support or modular element 11 of the present invention represents an essential part of a strong, compact, functional and practical structure for producing writing desks and tables of variable configurations. Furthermore the combinations which can be produced are not limited solely to those illustrated in the drawings, but they may extend to more or less complex and close-packed assemblies, providing variable and unlimited configurations.

It will be appreciated that the support for writing desks and tables of variable configurations as described herein may be the subject of modifications and improvements both in regard to the form and the arrangement of the various parts without thereby departing from the scope of the invention.

What I claim is:

1. A support for writing desks or tables of variable configuration, wherein each desk or table includes a horizontal worktop portion, and vertical support members, said support comprising a longitudinal support which extends below said worktop portion and which structurally connects the worktop portion with said vertical support members, wherein said longitudinal support comprises:

one lengthened modular element and another lengthened modular element, each one formed by a profiled portion with a section of open channel, inverted Omega shape including a bottom wall and two lateral walls having two upper flanges, wherein said profiled portion has an end including two first members of C-shaped section having a stiffening function for an end of the two lateral walls and the bottom walls of said one and said other lengthened modular elements and fixed internally to the end of said profiled portion, and at least one lateral connecting portion in the lateral walls of said profiled portion; and first connecting means and second connecting means for causing said one lengthened modular element to be optionally connected with the other lengthened modular element straightward and perpendicular with respect to said other lengthened modular element, respectively;

wherein said first connecting means comprises two second members of C-shaped section connected internally with said two first members of C-shaped section of said one and said other lengthened modular elements and locking members for locking the two second members of C-shaped section with said two first members of C-shaped section to align said other lengthened modular element straightwardly with respect to said one lengthened modular element;

wherein said second connecting means comprises an interconnecting member having a first end portion and a second end portion wherein said first end portion includes two third members of C-shaped section to be connected with the two first members of C-shaped section of said other lengthened modular element through two further second members of C-shaped configuration, and said locking members and wherein said second end portion comprises a flanged portion to be connected with said at least one lateral connecting portion of said one lengthened modular element for positioning said other modular element perpendicular with respect to said one lengthened modular element;

wherein the two upper flanges of said one and said other lengthened modular elements are fixed to a lower surface of said worktop portion and said bottom wall and said lateral walls of said one and said other lengthened modular elements are capable of internally housing power outlets and cables and are provided with openings which are sufficiently large to define passage therethrough of said power outlets and manual access to said cables; and wherein said at least one lateral connecting portion of said one of said other lengthened modular elements and the flanged portion of said interconnecting member each define a large opening and wherein the second two C-shaped members of said first connecting means and the openings of said at least one lateral connecting portion and said interconnection member permit continuity in respect of passage of said cables.

2. A support according to claim 1, further comprising a terminal module having a cross section identical to said section of open channel inverted Omega shape, and wherein said terminal module comprises at one end a front inclined wall having a hole and at another end two fourth members of C-shaped section to be connected with said two further first members of C-shaped section fixed to another end of the one or the other lengthened modular element.

3. A support according to claim 1, wherein said locking members comprise a plurality of screws and nuts.

4. A support according to claim 1, wherein said profiled portion has a second end including two further first members of C-shaped section having a stiffening function for said second end and for being optionally connected with said two second members or third members of C-shaped section.

5. A support according to claim 1, further comprising a third lengthened modular element identical to the one lengthened modular element, wherein said other lengthened modular element is positioned perpendicular to said one lengthened modular element and wherein said third lengthened modular element is connected straightwardly with respect to said one lengthened modular element through further first connecting means.

6. A support for writing desks or tables of variable configuration, wherein each desk or table includes a horizontal worktop portion and vertical support members, wherein said support comprises a longitudinal support which extends below and centrally to said worktop portion and which structurally connects the worktop portion with said vertical support members, wherein said longitudinal support comprises:

two lengthened modular elements to be connected to each other, wherein each one of said two lengthened modular elements is formed by a profiled portion with a section of open channel, inverted Omega shape having an end portion and including a bottom wall and two lateral walls having two corresponding upper flanges, wherein said bottom wall and said lateral walls include a first group and a second group of large openings, respectively, and said lateral walls include a plurality of lateral portions around said second group of large openings;

interconnecting means for jointly cooperating with one of said plurality of lateral portions and said end portion;

end connecting means for optionally connecting together the end portion of one of said two lengthened modular elements with the end portion of the other of said two lengthened modular elements to define a straightward configuration, wherein said end connecting means are provided to connect together, and in alternative, the end portion of said one lengthened modular element with said interconnecting means and said interconnecting means with the one of said lateral portions of the other lengthened modular element to define a perpendicular configuration, and wherein said interconnecting means and said end connecting means are provided to cause the upper flanges of the two lengthened modular elements to be disposed on a common horizontal plane; and fixing means for causing said two upper flanges of the one and the other lengthened modular element to be centrally fixed to a lower surface of said worktop portion on said common horizontal plane;

wherein said bottom walls, said lateral walls and the lower surface of said worktop portion are capable of internally confining power outlets and cables, and wherein said first group and second group of large openings define passage therethrough of said power outlets and manual access to said cables; and wherein said interconnecting means and said end connecting means permit continuity in respect of passage of said cables through the end portions and the second group of large openings of the one and the other lengthened modular elements in the straightward and perpendicular configurations, respectively.

7. A support according to claim 6, wherein said end connecting means comprise first and second coupling means, wherein said first and said second coupling means are provided for cooperating with the end portion of each one of said two lengthened modular elements, and wherein said interconnecting means comprise third and fourth coupling means, said third coupling means being provided for cooperating with the one of said lateral portions of each one of said two lengthened modular elements and said fourth coupling means being provided for cooperating with said first or said second coupling means; further comprising first locking means for locking together said third coupling means with said one of said plurality of lateral portions; and second locking means for optionally locking together said first coupling means with the end portion of the other lengthened modular element and said second coupling means, with the end portion of said one lengthened modular element to define said straightward configuration or, in alternative, with said fourth connecting means to define said perpendicular configuration, respectively.

8. A support according to claim 6, wherein the end portion of said profiled portion includes two first members of C-shaped configurations and wherein said end connecting means comprises two second members of C-shaped configurations and locking means for said first and second C-shaped members, wherein the first two members of C-shaped configurations have a stiffening function for the end portion of said profiled portion and wherein said two second members of C-shaped configurations are provided to engage internally with the two first members of C-shaped configurations of the one and the other lengthened modular elements and to be locked by said locking means to said two first members of C-shaped configurations to provide said straightward configuration.

9. A support according to claim 6, wherein the one of said plurality of lateral portions of said other lengthened modular element defines one of said large openings, wherein said interconnecting means comprises an interconnecting module having a first portion connectable with said end connecting means, a flange having a hole to be connected with the one of said plurality of lateral portions of said other lengthened modular element, first locking means for locking said flange with the one of said plurality of lateral portions and to provide said hole to be aligned with said one large opening.

10. A support according to claim 9, wherein the end portion of said profiled portion of said one lengthened modular element and said interconnecting module each include two first members of C-shaped configurations and wherein said end connecting means comprises two second members of C-shaped configurations and second locking means for said first and second C-shaped members, wherein the first two members of C-shaped configurations have a stiffening function for the end portion of said profiled portion and of said interconnecting module, and wherein said two second members of C-shaped configurations are provided to engage internally with the two first members of C-shaped configurations of said one lengthened modular element and said interconnecting module to be locked by said locking means to said two first members of C-shaped configurations to provide said perpendicular configuration.

* * * * *